May 16, 1933.  C. A. KOZA  1,909,366
TOOL
Filed May 5, 1932   2 Sheets-Sheet 1
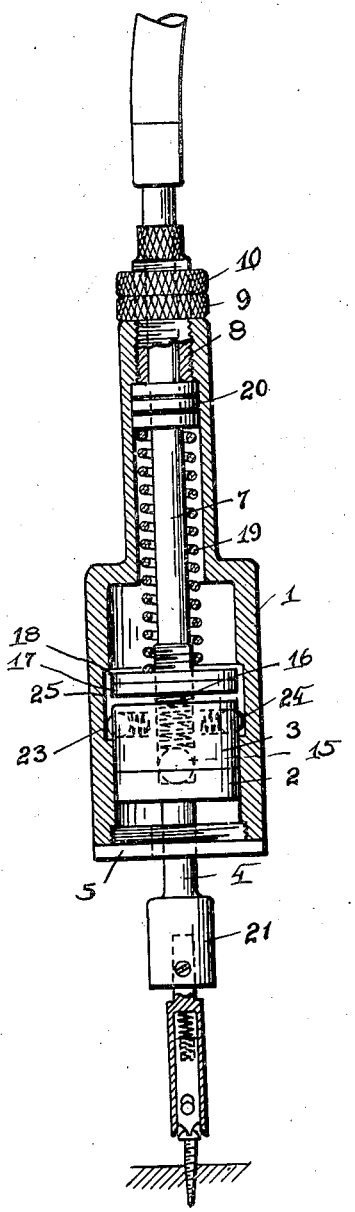
FIG.1.
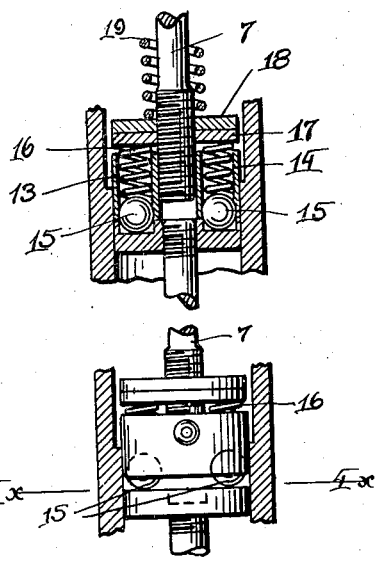
FIG.2.
FIG.3.
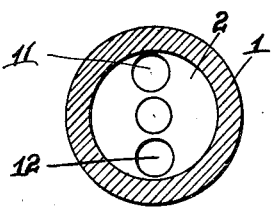
FIG.4.
INVENTOR
CHARLES A. KOZA
BY
ATTORNEY May 16, 1933.    C. A. KOZA    1,909,366
TOOL
Filed May 5, 1932    2 Sheets-Sheet 2

INVENTOR
CHARLES A. KOZA
BY
Eric Dschinger
ATTORNEY

Patented May 16, 1933

1,909,366

UNITED STATES PATENT OFFICE

CHARLES A. KOZA, OF PHILADELPHIA, PENNSYLVANIA

TOOL

Application filed May 5, 1932. Serial No. 609,469.

This invention relates to tools for driving and setting screws, nuts and bolts and has for its object to provide a novel construction for such a tool which is simple in construction, inexpensive in its manufacture and extremely efficient in its operation.

Another object of this invention is to so construct the clutch mechanism of the tool that it may also be used in tapping and riveting apparatus.

These and other objects of this invention will become more readily apparent from the detailed description of the invention, reference being had to the accompanying drawings in which Figure 1 is a vertical sectional view of the driving and setting tool.

Figure 2 is a detail sectional view of the clutch of the driving and setting tool.

Figure 3 is a detail view of the clutch with the clutch members in disengagement.

Figure 4 is a horizontal sectional view of the clutch, the section being taken on the line 4x—4x of Figure 3.

In the several figures of the drawings like reference numerals indicate like parts.

Figure 5:
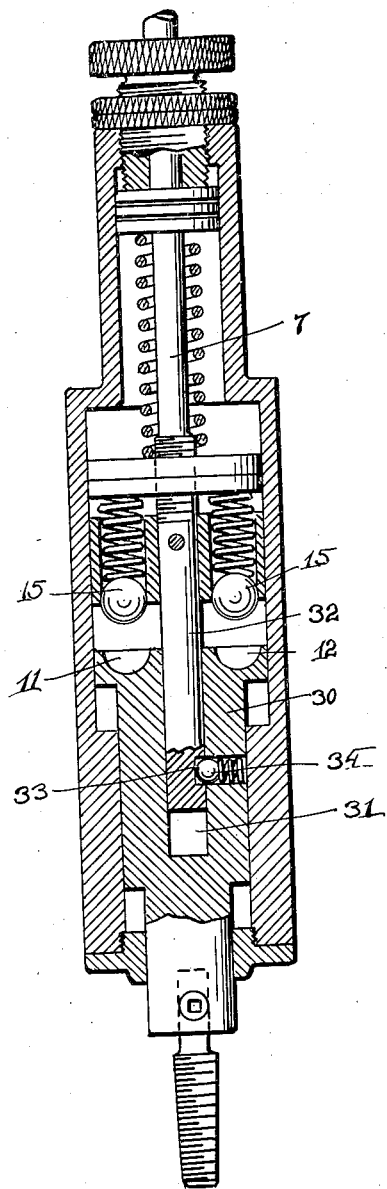
Figure 5 is a vertical sectional view of a tapping tool embodying my improved clutch mechanism.

The clutch mechanism of the tool which forms the subject matter of my present invention operates to drive screws, nuts or bolts and at the end of the driving operation automatically sets them, suitable adjusting means being provided for the clutch mechanism so that the setting and driving operation can be adjusted to suit any and all conditions.

As illustrated in Figure 1, the tool comprises a tubular casing 1 which is enlarged at one end to have the clutch members 2 and 3 mounted to rotate therein. Each of these clutch members has a shaft threaded or otherwise fastened thereto and shaft 4 of clutch member 2 passes thru the bushing 5 which is threaded into and closes the end of the tubular casing 1 to provide a bearing for the shaft 4 in the end of the casing.

Shaft 7 is fastened to the clutch member 3. Bushing 8 in the reduced end of the casing 1 provides a bearing thru which this shaft projects to the outside of the casing. Bushing 8 is threaded into the end of the casing 1 and carries the lock nuts 9 and 10 on the outside of the casing with which the bushing may be adjustably locked in place in the end of the casing for a purpose that will presently appear.

Both of the clutch members 2 and 3 are circular in cross section and are adapted to freely rotate within the enlarged portion of the tubular casing 1. Clutch member 2 is provided in the end with a pair of cylindrical pockets 11 and 12 which are located diagonally opposite each other. Clutch member 3 is provided with a pair of sockets 13 and 14 from one end of each of which normally projects a ball member 15 which engages into the pockets 11 and 12 of the clutch member 2. The ball members 15 are yieldingly held to project from the clutch member 3 into the pockets of the clutch member 2 by means of the expansion springs 16 which are located in the sockets 13 and 14 in back of the ball members 15. The springs 16 project from the sockets in the clutch members and are adjustably held under tension by means of the lock nuts 17 and 18 threaded on the shaft 7. The tension of the springs can thus be varied to increase or decrease their pressure on the ball members 15 for a purpose which will presently appear.

Surrounding the shaft 7 is an expansion spring 19 which rests with one end against the lock nut 18 and with the other end against the thrust ball bearing 20 which surrounds the shaft 7 below the bushing 8. The thrust bearing is freely mounted on the shaft 7 and by threading the bushing down onto this bearing it compresses the spring 18 and increases the pressure which it exerts on clutch member 3.

Shaft 4 is provided with a suitable socket 21 and into this socket may be fastened the screw driver, socket wrench or other tool which is to be operated by the driving and setting tool. To the end of the shaft 7 is attached the driving means such as the socket of a drill press or the end of a flexible shaft with which the shaft 4 can be rotated for the operation of the tool.

In the adjustment of the tool the two lock nuts 17 and 18 are first adjusted on the shaft 7 by threading them down onto the springs 16 in order that these springs may hold the ball members 15 to project out of the sockets 13 and 14 under the desired pressure. After this adjustment is made the clutch members are mounted in the casing as above described and illustrated in the figures of the drawings and any further adjustment is done by threading the bushing 8 in and out of the upper end of the casing 2. In threading this bushing into the casing the end of the bushing forces the thrust bearing 20 against the end of the expansion spring and compresses the spring 19 in order to regulate the initial pressure with which the tool will be held in engagement with the screw or bolt when driving it in place.

In the operation of the tool, the screw driver or socket wrench which is attached thereto, is brought in engagement with the head of the screw or bolt and held in engagement with it while the rotary motion of the shaft 7 is transmitted thru the clutch members 2 and 3 to the shaft 4 and the driver attached thereto. This rotates the screw or bolt while the casing 1, which also forms the handle of the tool, is held firmly in the hand with sufficient downward pressure to keep the driver in engagement with the head of the screw or bolt which is being driven in place. In so doing the pressure exerted by the spring 19 serves to keep the clutch members from separating at a pressure which will insure the driving of the screw or bolt the full length of it. If the pressure exerted by the spring 19 as adjusted by the bushing 8 is not sufficient, additional pressure can be temporarily exerted on the clutch members by forcing the casing or handle 1 down toward the screw or bolt in order to further compress the spring 19 until the screw or bolt has been driven in place.

It is a well known fact that a screw, bolt or nut can be drawn tighter when the head of the screw or bolt or the nut is given one or more hard blows during the final tightening thereof. Such a blow or blows are produced by my tool when the ball members 15 slip in and out of the pockets 11 and 12 and separate the clutch members 2 and 3 against the pressure of the springs 16. Thus after the screw, bolt or nut has been driven in place by the tool and cannot be rotated any further, the torque of the shaft 7 forces the ball members 15 out of the pockets to allow clutch member 2 to remain stationary while clutch member 3 keeps on rotating. During this rotation the ball members 15 are forced in and out of the pockets 11 and 12 and in so doing produce blows on the clutch member 2 which are transmitted to the screw, bolt or nut. These blows in combination with the torque exerted by the shaft thus give the head of the screw or bolt or the nut their final setting.

After the screw, bolt or nut has been threaded in place, the tool is lifted and in doing so the upper clutch member 3 is raised from the lower clutch member so that the ball member no longer forms a driving connection between them until the clutch members are again brought together in driving the next screw, bolt or nut.

In order to prevent the operator of the tool from exerting an excessive pressure on the head of the bolt or screw while it is being driven in place, the longitudinal movement of the clutch member is limited. For this purpose a pair of spring pressed balls 23 and 24 are mounted in the wall of the clutch member 3 and project from the periphery thereof into the enlarged section 25 provided on the inside of the casing or handle 1. In this way the movement of the clutch member 3 is limited to the travel of the spring pressed balls 23 and 24 from one end of the enlarged section 25 to the other end thereof.

In Figure 5 I have illustrated a tapping tool operated by the clutch forming the subject matter of this invention. In this tapping tool the clutch is modified by providing the lower clutch member 2 with a shank 30 which has a central socket 31 into which extends an extension 32 of the shaft 7. This extension of the shaft 7 is adapted to slide up and down in the socket 31 and in the side of the extension is provided a pocket 33 into which engages the spring pressed ball member 34 mounted in the shank 30 of the clutch member 2. When the extension 32 of the shaft is moved down to the end of the central socket 31 the ball member 34 is forced out of the pocket 33 while the ball members 15, 15 of the clutch member are brought into engagement with the pockets 11 and 12 of the clutch member 2. While the extension 32 is thus free to rotate in the socket 31, the engagement of the ball members 15 with the clutch member 2 operate to rotate the shank 30 on the rotation of the shaft 7. In moving the extension upward the ball members 15 are moved out of engagement with the clutch member 2 and break the driving connection between the clutch members 2 and 3. However while the ball members 15 of the clutch member 3 are moved out of engagement with the pockets 11 and 12 of the clutch member 2, the pocket 33 is brought in alignment with the ball member 34 so that this ball member can engage into this pocket and form a driving connection between the shank 30 of the clutch member 2 and the extension 32 of the shaft 7.

With the tapping tool are used a reversible drive means (not shown) for the shaft 7 and these drive means operate to rotate the shaft 7 in one direction when the clutch members 2 and 3 are connected by the ball members 15, and drive the shaft in the opposite direction when the driving conection between the shaft 7 and the clutch member 2 is provided by the ball member 34. The tap 35 attached to the tool is thus rotated to cut the thread by depressing the handle or casing 1 of the tool to bring the two clutch members 2 and 3 together, and is rotated to withdraw the tap by raising the handle or casing 1 to separate the two clutch members and cause the shank 30 to be rotated in the reverse direction by the extension 32 of the shaft 7.

Figure 6:
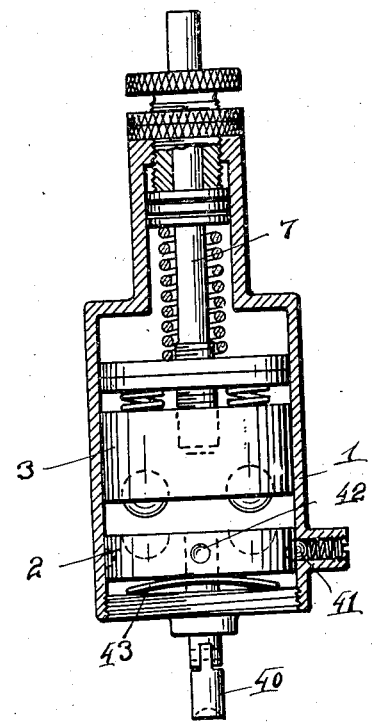
Figure 6 is a vertical sectional view of a riveting tool embodying my improved clutch mechanism.

In the riveting tool illustrated in Figure 6 an intermittent disengagement between clutch members 2 and 3 is utilized to provide short reciprocating motions or blows for the riveting tool 40 which is attached to the shaft 4 of the clutch member 2. To provide this continued engagement and disengagement between the two clutch members, a spring pressed ball member 41, mounted in the casing 1, engages into suitable pockets 42 provided in the periphery of the clutch member 2 and temporarily arrests the rotation of the clutch member 2 by the clutch member 3 each time it engages into one of the pockets. When the clutch member is arrested in this way, the continued rotation of the clutch member 3 forces the ball member 15 out of the pockets in the clutch member 2 and in so doing depresses the clutch member 2 to produce a blow that is transmitted to the riveting tool. As the ball members 15 realign themselves with the pockets in the clutch member 2, the spring 43 raises the clutch member to bring the ball members in engagement with these pockets and permit the torque exerted by the clutch member 3 to rotate the clutch member 2 until it is again arrested by the ball member 41 for the next blow of the riveting tool. As the shaft 7 is rotated at a fairly high speed, a great number of blows are thus produced by the riveting tool while the riveting tool is at the same time intermittently rotated.

I claim:

1. In a tool of the character described, the combination of a driving and a driven shaft, a clutch member provided on each of said shafts, a casing surrounding said clutch members, a fixed bearing in one end of said casing for said driven shaft and an adjustable bearing in the other end of said casing for said driving shaft, a ball member projecting from said clutch member of said driving shaft, said clutch member of said driven shaft having a pocket therein adapted to have said ball member project thereinto, a thrust washer on said driving shaft behind said clutch member thereof, a spring interposed between said ball member and said thrust washer, a thrust bearing surrounding said driving shaft at the inner side of said adjustable bearing and a spring surrounding said driving shaft between said thrust washer and said thrust bearing.

2. In a tool of the character described, the combination of a driving and a driven shaft, a clutch member provided on each of said shafts, a casing surrounding said clutch members, a fixed bearing in one end of said casing for said driven shaft and an adjustable bearing in the other end of said casing for said driving shaft, a ball member projecting from said clutch member of said driving shaft, said clutch member of said driven shaft having a pocket therein adapted to have said ball member project thereinto, a thrust washer on said driving shaft behind said clutch member thereof, a spring interposed between said ball member and said thrust washer, a thrust bearing surrounding said driving shaft in the inside of said adjustable bearing and a spring surrounding said driving shaft between said thrust washer and said thrust bearing, an annular groove formed within said casing and spring pressed means projecting from said clutch member of said driving shaft into said annular groove to limit the endwise movement of said clutch member within said casing.

3. In a tool of the class described, the combination of a driving shaft and a driven shaft, a casing, each of said shafts having a rotating and endwise movement within said casing, a fixed bearing in one end of said casing for said driven shaft and a bearing adjustable endwise for said driving shaft in the other end of said casing, a clutch member carried by each of said shafts, a pair of spring pressed ball members projecting from said clutch member of said driving shaft, said clutch member of said driven shafts having a pair of pockets formed therein adapted to receive said ball members, said casing having a space provided between said clutch member of said driven shaft and the end of said casing to permit an endwise movement of said driven clutch member away from said driving clutch member, and a spring interposed between said adjustable bearing and said driving clutch member.

4. In a tool of the class described, the combination of a driving shaft and a driven shaft, a casing, each of said shafts having a rotating and endwise movement within said casing, a fixed bearing in one end of said casing for said driven shaft and a bearing adjustable endwise for said driving shaft in the other end of said casing, a clutch member carried by each of said shafts, a pair of spring pressed ball members projecting from said clutch member of said driving shaft, said clutch member of said driven shaft having a pair of pockets formed therein adapted to receive said ball members, said casing having a space provided between said clutch member of said driven shaft and the end of said casing to permit an endwise movement of said driven clutch member away from said driving clutch member, a spring interposed between said adjustable bearing and said driving clutch member, and means for limiting the compression of said spring on the downward motion of said casing.

5. In a tool of the character described, the combination of a driving shaft and a driven shaft, a clutch member carried by each of said shafts, a casing surrounding said clutch member, a spring pressed ball member carried by said driving clutch member, said driven clutch member having a pocket formed therein adapted to receive said spring pressed ball member, said driven clutch member having a central longitudinal socket formed therein, an extension on said driving shaft adapted to slide in said socket, a spring pressed member carried by said driven clutch member and adapted to project into said socket, said extension of said driving shaft having a pocket formed therein adapted to have said spring pressed member engage into it to provide a driving connection between said driving shaft and said driven shaft on the endwise movement of said driving clutch member to disengage said spring pressed ball members from said pockets in said driven clutch member.

6. In a tool of the character described the combination of a driving and a driven clutch member, a casing surrounding said clutch members, a pair of spring pressed ball members projecting from said driving clutch member, said driven clutch member having a pair of pockets formed therein adapted to have said ball members project thereinto, spring pressed retarding means mounted in the wall of said casing and held in engagement with the periphery of said driven clutch member to intermittently retard the rotation of said driven clutch member to have said ball members intermittently force said driven clutch member away from said driving clutch member.

CHARLES A. KOZA.